(12) United States Patent
Zhou et al.

(10) Patent No.: US 6,559,992 B2
(45) Date of Patent: May 6, 2003

(54) ADJUSTABLE CHROMATIC DISPERSION COMPENSATION

(75) Inventors: Gan Zhou, Plano, TX (US); Kuang-Yi Wu, Plano, TX (US); Chi-Hao Cheng, Dallas, TX (US)

(73) Assignee: Chorum Technologies LP, Richardson, TX (US)

( * ) Notice: Subject to any disclaimer, the term of this patent is extended or adjusted under 35 U.S.C. 154(b) by 0 days.

(21) Appl. No.: 09/728,271

(22) Filed: Dec. 1, 2000

(65) Prior Publication Data

US 2002/0067487 A1 Jun. 6, 2002

Related U.S. Application Data

(60) Provisional application No. 60/192,770, filed on Mar. 27, 2000.

(51) Int. Cl.⁷ ............... H04B 10/00; H04B 10/12; H04J 14/08; G01B 9/02
(52) U.S. Cl. ............... 359/161; 359/173; 359/156; 359/138; 359/127; 356/477; 356/491
(58) Field of Search ................. 359/161, 173, 359/138, 127, 124, 156; 356/345, 351, 491, 477; 385/24

(56) References Cited

U.S. PATENT DOCUMENTS

| | | | | |
|---|---|---|---|---|
| 3,501,640 A | 3/1970 | Harris | | 250/199 |
| 4,019,807 A | 4/1977 | Boswell et al. | | 350/160 |
| 4,039,252 A | 8/1977 | Mizuno et al. | | 350/160 |
| 4,378,955 A | 4/1983 | Bieha, Jr. et al. | | 350/334 |
| 4,461,543 A | 7/1984 | McMahon | | 350/383 |
| 4,516,837 A | 5/1985 | Soref et al. | | 350/347 |
| 4,533,829 A | * 8/1985 | Miceli et al. | | 250/227 |
| 4,566,761 A | 1/1986 | Carlsen et al. | | 350/401 |
| 4,685,773 A | 8/1987 | Carlsen et al. | | 350/401 |
| 4,737,003 A | 4/1988 | Matsumura et al. | | 350/96.14 |
| 5,854,666 A | 12/1988 | Fujimaki | | 349/180 |
| 4,893,931 A | * 1/1990 | Lefevre et al. | | 356/351 |
| 4,896,947 A | 1/1990 | Leenhouts | | 350/337 |

(List continued on next page.)

FOREIGN PATENT DOCUMENTS

| | | |
|---|---|---|
| EP | 0 905 936 A2 | 3/1999 |
| WO | WO 98/47254 | 10/1998 |
| WO | WO 99/28778 | 6/1999 |
| WO | WO 99/45738 | 9/1999 |
| WO | WO 99/49605 | 9/1999 |

OTHER PUBLICATIONS

Carlsen et al.; "Flat Passband Birefringent Wavelength–Division Multiplexers"; Electronic Letters, vol. 23, 1987; pp. 106–107.

(List continued on next page.)

*Primary Examiner*—Leslie Pascal
*Assistant Examiner*—M. R. Sedighian
(74) *Attorney, Agent, or Firm*—Baker Botts L.L.P.

(57) ABSTRACT

An interferometer receives an input optical signal and outputs a signal after changing at least the dispersion of said signal. At least portions of the interferometer are adjustable to adjust at least a first dispersion parameter. Examples of dispersion parameters which are adjustable include dispersion magnitude, center wavelengths and waveshapes or slopes. Preferably the dispersion in the output signal is substantially reduced or substantially eliminated, compared to the dispersion of the input signal. By providing for adjustability of one or more dispersion parameters, a dispersion compensator can be appropriately adjusted for use in a variety of applications.

24 Claims, 3 Drawing Sheets

U.S. PATENT DOCUMENTS

| | | | | |
|---|---|---|---|---|
| 4,952,030 | A | 8/1990 | Nakagawa et al. | 350/337 |
| 4,999,619 | A | 3/1991 | Te Velde | 340/784 |
| 5,105,289 | A | 4/1992 | Sonehara et al. | 359/70 |
| 5,185,824 | A | 2/1993 | Grimes et al. | 385/19 |
| 5,477,350 | A | 12/1995 | Riza et al. | 359/39 |
| 5,555,113 | A | 9/1996 | Mulkens et al. | 359/63 |
| 5,596,661 | A | 1/1997 | Henry et al. | 385/24 |
| 5,608,652 | A | 3/1997 | Astle | 364/514 |
| 5,623,360 | A * | 4/1997 | Gesell et al. | 359/287 |
| 5,680,490 | A | 10/1997 | Cohen et al. | 385/24 |
| 5,694,233 | A | 12/1997 | Wu et al. | 359/117 |
| 5,712,704 | A * | 1/1998 | Martin et al. | 356/351 |
| 5,724,165 | A | 3/1998 | Wu | 359/117 |
| 5,726,723 | A | 3/1998 | Wang et al. | 349/75 |
| 5,740,288 | A | 4/1998 | Pan | 385/11 |
| 5,809,190 | A | 9/1998 | Chen | 385/43 |
| 5,867,291 | A | 2/1999 | Wu et al. | 359/124 |
| 5,870,164 | A | 2/1999 | Lu et al. | 349/180 |
| 5,877,876 | A | 3/1999 | Birdwell | 359/39 |
| 5,883,687 | A | 3/1999 | Lu et al. | 349/201 |
| 5,912,748 | A | 6/1999 | Wu et al. | 359/117 |
| 5,933,207 | A | 8/1999 | Wu | 349/99 |
| 5,936,697 | A | 8/1999 | Yang | 349/180 |
| 5,943,151 | A | 8/1999 | Grasso et al. | 359/161 |
| 5,963,291 | A | 10/1999 | Wu et al. | 349/196 |
| 5,978,116 | A | 11/1999 | Wu et al. | 359/124 |
| 6,005,697 | A | 12/1999 | Wu et al. | 359/117 |
| 6,055,081 | A * | 4/2000 | Koyano et al. | 359/161 |
| 6,067,178 | A | 5/2000 | Zheng | 359/124 |
| 6,094,246 | A | 7/2000 | Wong et al. | 349/99 |
| 6,097,451 | A | 8/2000 | Palmer et al. | 349/14 |
| 6,111,625 | A | 8/2000 | Ohta et al. | 349/141 |
| 6,130,971 | A | 10/2000 | Cao | 385/31 |
| 6,134,358 | A | 10/2000 | Wu et al. | 385/16 |
| 6,137,585 | A * | 10/2000 | Hitzenberger et al. | 356/484 |
| 6,137,604 | A * | 10/2000 | Bergano | 359/124 |
| 6,137,606 | A | 10/2000 | Wu et al. | 359/124 |
| 6,141,076 | A | 10/2000 | Liu et al. | 349/134 |
| 6,144,494 | A | 11/2000 | Shirasaki et al. | 359/578 |
| 6,151,158 | A | 11/2000 | Takeda et al. | 359/341 |
| 6,166,838 | A | 12/2000 | Liu et al. | 359/128 |
| 6,169,604 | B1 | 1/2001 | Cao | 356/519 |
| 6,175,432 | B1 | 1/2001 | Wu et al. | 359/124 |
| 6,212,313 | B1 | 4/2001 | Li | 385/24 |
| 6,249,350 | B1 * | 6/2001 | Dultz et al. | 356/491 |
| 6,310,993 | B1 * | 10/2001 | Cao et al. | 385/24 |

OTHER PUBLICATIONS

Fujii et al.; "Wavelength–Division Multi/Demultiplexer Utilizing Optically Active Crystals"; Journal of Lightwave Technology, vol. 8, No. 7, Jul. 1990; pp. 1051–1054.

Ishio et al.; "Review and Status of Wavelength–Division–Multiplexing Technology and its Application"; Journal of Lightwave Technology; vol. LT–2, No. 4, Aug. 1984; pp. 448–463.

Mahlein; "Fiber–Optic Communication in the Wavelength–Division Multiplex Mode"; Fiber and Integrated Optics, vol. 4, No. 4, Jun. 1982; pp. 339–372.

Melman et al.; "Tunable Birefringent Wavelength–Division Multiplexer/Demultiplexer"; Electronic Letters; vol. 21, 1985; pp. 634–635.

Senior et al.; "Devices for Wavelength Multiplexing and Demultiplexing"; IEEE Proceedings, vol. 136, Pt. J. No. 3, Jun. 1989; pp. 183–202.

Internet DCG ITU Dispersion Compensating Fiber Gratings, 1 page.

Internet TIGRA Tunable Dispersion Equalization Module, 2 pages.

Inoue et al., "A Four–Channel Optical Waveguide Multi/Demultiplexer for 5–Ghz Spaced Optical FDM Transmission", Journal of Lightwave Technology, 6:2 (1998) 339–345.

Madsen et al., "A General Planar Waveguide Autoregressive Optical Filter", Journal of Lightwave Technology, 14:3 (1996) 437–447.

C.K. Madsen, "A Multiport Frequency Band Selector with Inherently Low Loss, Flat Passbands, and Low Crosstalk", IEEE Photonics Technology Letters, 10:12 (1998) 1766–1768.

Chung et al., "Analysis of a Tunable Multichannel Two–Mode–Interference Wavelength Division Multiplexer/Demultiplexer", Journal of Lightwave Technology, 7:5 (1989) 766–777.

Liu et al., "Digitally Programmable Wavelength–Switching Technology", IEEE/LEDS Summer Topical Meetings Aug. 1997, 9–10.

Madsen, "Efficient Architectures for Exactly Realizing Optical Filters with Optimum Bandpass Designs", IEEE Photonics Technology Letters, 10:8 (1998) 1136–1138.

Dingel et al., "Multifunction optical filter with a Michelson–Gires–Tournois interferometer for wavelength–division–multiplexed network system applications", Optics Letters, 23:14 (1998) 1099–1101.

Madsen et al., "Optical All–Pass Filters for Phase Response Design with Applications for Dispersion Compensation", IEEE Photonics Technology Letters, 10:7 (1998) 994–996.

Nosu et al., "Optical FDM Transmission Technique", Journal of Lightwave Technology, LT–5:9 (1987) 1301–1308.

Dingel et al., "Optical wave–front transformer using the multiple–reflection interference effect inside a resonator", Optics Letters, 22:9 (1997) 1449–1451.

Dingel et al., "Properties of a Novel Noncascaded Type, Easy–to–Design, Ripple–Free Optical Bandpass Filter", Journal of Lightwave Technology, 17:8 (1999) 1461–1469.

Peng et al., "Optical implementation of regular rectangular CC–banyon network by using polarizing beam splitters", Optics Communications, 117: (1995) 37–42.

Lenz et al., "Dispersive Properties of Optical Filters for WDM Systems", IEEE Journal of Quantum Electronics, 34:8 (1998) 1390–1402.

Noguchi et al., "A Rearrangeable Multichannel Free–Space Optical Switch Based on Multistage Network Configuration", Journal of Lightwave Technology, 9:12 (1991) 1726–1732.

Kuroyanagi et al., "Optical Cross–Connect Architecture Using Free–Space Optical Switches Based on PI–LOSS Topology", Fujitsu Laboratories Ltd., (1995) 2112–2117.

Agrawal, "Fiber–Optic Communication Systems; Dispersion Compensation (Chapter 9)", The Institute of Optics, 425–467.

* cited by examiner

ADJUSTABLE CHROMATIC DISPERSION COMPENSATION

CROSS REFERENCE TO RELATED APPLICATION

The present application claims priority from U.S. Provisional Application Ser. No. 60/192,770 filed Mar. 27, 2000, which is incorporated herein by reference.

Cross reference is made to U.S. patent application Ser. No. 09/469,336 titled "Dispersion Compensation for Optical Systems," incorporated herein by reference. The present invention relates to methods and apparatus for compensating chromatic dispersion and, in particular, methods and apparatus providing for selection and/or adjustment of compensation parameters such as center wavelength, dispersion slope or waveshape and/or dispersion magnitude.

BACKGROUND INFORMATION

A number of systems have been used or proposed which employ optical components, exclusively or partially, for communicating information (typically digitally), including systems for switching, routing, transmitting and the like. As one example, in the past, interferometers have been used to implement wavelength routers, for example as reported in B. B. Dingle and M. Izutsu, "Multifunction Optical Filter with a Michelson-Gires-Tournois Interferometer for Wavelength-division-multiplexed Network System Applications", *Optics Letters*, volume 23, page 1099 (1998) and references therein. Generally, optical systems provide certain advantages over, e.g. fully-electronic networks (e.g. providing typically higher data rates, requiring less physical space, less susceptibility to electromagnetic interference, and the like) but also present their own set of issues. These issues include signal loss and signal dispersion, each of which can occur either during transmission along optical fiber cables (or other transmission lines) or in discrete equipment or components such as optical routers, switches, hubs, bridges, multiplexers and the like. Certain types of components, such as erbium doped fiber amplifiers (EDFA) can provide sufficient amplification to overcome some or all transmission line losses, thus providing a system in which the limiting factor tends to be dispersion.

In general, dispersion refers to change or degradation of the wave shape of an optical signal, such as an (ideally) square-edged pulse. In general, the fact that different wavelengths have different effective rates of transmission along an optical transmission line and/or different indices of refraction and reflection can lead to pulse (or other signal) degradation, e.g. such that an original signal comprising a sequential plurality of square-edged pulses will, as a result of so-called "chromatic" dispersion, be changed such that each pulse, rather than retaining a substantially square-edged shape will have a more rounded, Gaussian shape. Dispersion can lead to, e.g. partial overlap between successive pulses resulting in signal detection problems such as high bit error rates, decrease in spectral efficiency or other problems, especially when combined with signal loss (amplitude reduction). Accordingly, it would be useful to provide a method and apparatus for use in optical systems, which can compensate for and/or reduce the amount of dispersion effect.

The dispersion problems become even more severe for wavelength division multiplexing (WDM) systems. The dense wavelength-division multiplexing (DWDM) scheme is widely adapted as one of the optimal solutions to improve the bandwidth usage on optical fibers. By multiplexing multiple signals on different optical wavelengths, bandwidth of a single fiber can be multiple folded. Key optical components in DWDM systems include those which perform wavelength combining (multiplexing) and separating (demultiplexing) functions. The spectral response of the multiplexers and demultiplexers for DWDM applications are generally accompanied by certain dispersion effects that are determined by the underlying filtering technology. For example, the dispersion characteristic of a fiber Bragg grating can be determined by Hilbert transforming its transmission spectral response (e.g. as generally described in "Dispersion Properties of Optical Filters for WDM Systems" G. Lenz, B. J. Eggleton, C. R. Giles, C. K. Madsen, and R. E. Slusher, IEEE Journal of Quantum Electronics, Vol. 34, No 8 Page 1390–1402). The dispersion effects of wavelength multiplexing and filtering are very different from those of optical fibers. Optical fiber generally shows a linear dependency of its dispersion characteristic versus wavelength. Wavelength filters, multiplexers and demultiplexers, on the other hands, generally show nonlinear dispersion properties, e.g. correlated to its amplitude (spectral) response within its passband window.

A number of devices and techniques have been used or proposed in attempts to address dispersion issues. For example, a number of approaches have been based on using various bulk optics modules such as using dispersion compensation fiber (DCF), chirped gratings or other bulk optics modules. Previous approaches, however, have typically provided substantially static or unchangeable dispersion compensation parameters, such as providing substantially unchanging center wavelengths, dispersion slope and/or dispersion magnitude. As a result, such typical approaches lack versatility, making it difficult or substantially impossible to use a given module for more than one, or a relatively few applications. Accordingly, it would be useful to provide chromatic dispersion compensators which were adjustable, providing for adjustment or selection of one or more compensation parameters such as adjustment of center wavelength, adjustment of dispersion slope and/or adjustment of dispersion magnitude.

SUMMARY OF THE INVENTION

The present invention includes a recognition of the existence, nature and/or source of certain problems in previous approaches, including as described herein. In embodiments of the present invention, devices and techniques for dispersion compensation, preferably with adjustability of at least some parameters, are based on an optical interferometer. In at least one embodiment, a dispersion compensation apparatus provides an interferometer which splits an incoming optical signal into first and second distinct paths. The signal portions on the first and second distinct paths are later recombined and the interferometer outputs an output signal characterized by at least a first dispersion parameter. When the input signal includes an amount of dispersion, such as chromatic dispersion, the interferometer is configured (as described, e.g. more thoroughly below) such that the output signal has the dispersion reduced or substantially eliminated. Different embodiments or applications of the device and technique of the present invention may be used for compensating any of a variety of different magnitudes of dispersion that may occur in the input signal. For example, if the input signal has a first amount of chromatic dispersion, the interferometer preferably provides an amount of dispersion which is equal in magnitude but opposite in sign, to achieve an output signal with substantially zero dispersion. In this context, dispersion values are approximately equal in magnitude if the absolute value of the difference in magnitude is sufficiently small that, upon combining oppositely-signed signals, the resulting signal has a dispersion, in at least a first wave-length band of interest (such as a 90 to 95 percent transmission wavelength band) which is sufficiently low to achieve desired signal dispersion goals, such as being less than about 80 picoseconds nanometer (ps/nm) preferably less than about 20 ps/nm in the output signal passbands. In at least one embodiment of the present invention, the interferometer is adjustable e.g., so as to permit the magnitude of the compensating dispersion to be adjusted allowing a single device configuration to be used in any of a number of different applications.

In addition to (or in place of) providing for adjustment of dispersion magnitude, embodiments of the present invention can also be implemented so as to provide adjustment of dispersion parameters other than (or in place of) adjustment of dispersion magnitude. For example, embodiments of the present invention can be implemented to provide for adjustment of (compensating) dispersion center frequency and/or dispersion slope (i.e. the slope of dispersion expressed, e.g. as a function of frequency) and/or wave shape. In one embodiment, the magnitude of (compensating) dispersion is adjusted by adjusting the split-off ratio of an interferometer. In one embodiment, the "center" wavelengths (e.g. local dispersion maximum or minimum, e.g. with respect to pass bands or stop bands of an input signal) is adjusted by tuning the optical path lengths in the interferometer or components thereof. In embodiments in which the interferometer includes a resonator (e.g. Fabry-Perot cavity), dispersion parameters can be adjusted, e.g. by changing resonator mirror reflectivity, resonator path length and the like. The present invention can be used in connection with numerous types of interferometers including polarization interferometers, such as free-space interferometers, fiber optic interferometers, Mach-Zender interferometers and the like.

According to one aspect of the invention, an interferometer receives an input optical signal and outputs a signal after changing at least the dispersion of said signal. At least portions of the interferometer are adjustable to adjust at least a first dispersion parameter. Examples of dispersion parameters which are adjustable include dispersion magnitude, center wavelengths and waveshapes or slopes. Preferably the dispersion in the output signal is substantially reduced or substantially eliminated, compared to the dispersion of the input signal. By providing for adjustability of one or more dispersion parameters, a dispersion compensator can be appropriately adjusted for use in a variety of applications.

DETAILED DESCRIPTION OF THE PREFERRED EMBODIMENTS

Figure 1:
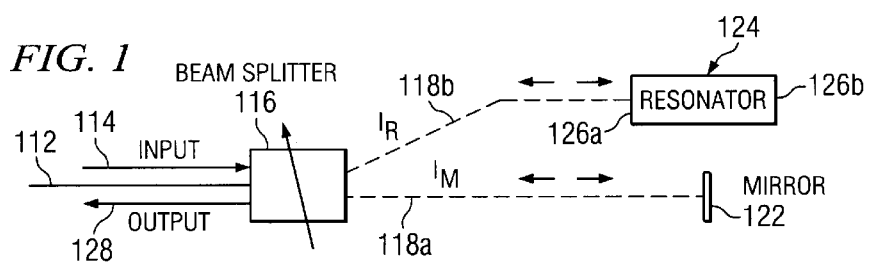
FIG. 1 is a block diagram of an interferometer of a type which can be used in connection with embodiments of the present invention.

The embodiments of the present invention can be implemented using any of a number of different types of interferometers. FIG. 1 illustrates one example of one such suitable interferometer, in block diagram form. In the configuration depicted in FIG. 1, an optical fiber 112 is provided with an input signal traveling in a first direction 114. For example, the input signal may be a laser signal modulated to provide a wave division multiplex (WDM) or other optical signal. The input signal is delivered to a beam splitter 116. Any of a number of types of beam splitters 116 are contemplated and those of skill in the art will understand how to select and use a suitable beam splitter at least after understanding the present disclosure The beam splitter 116 splits the input beam into first and second beams 118a, 118b having intensities or powers $I_M$ and $I_R$ respectively. The split off ratio S is defined as $S=I_R/(I_R+I_M)$ where $I_M$ is the optical power in the mirror path 118a and $I_R$ is the optical power in the resonator path 118b.

The first ("mirror") path 118a propagates towards a mirror 122 and is reflected back by the mirror along the same path 118a. The second (resonator) path 118b propagates towards a resonator 124 and is reflected back along path 118b. In at least one embodiment, the resonator 124 is a Fabry-Perot cavity with the front mirror 126a partially reflecting, and the back mirror 126b totally reflecting. Such a resonator 124 reflects all of the incident power back, regardless of wavelength. However, the group delay of the reflected light from the resonator 124 is strongly dependent on wavelength.

Figure 2:
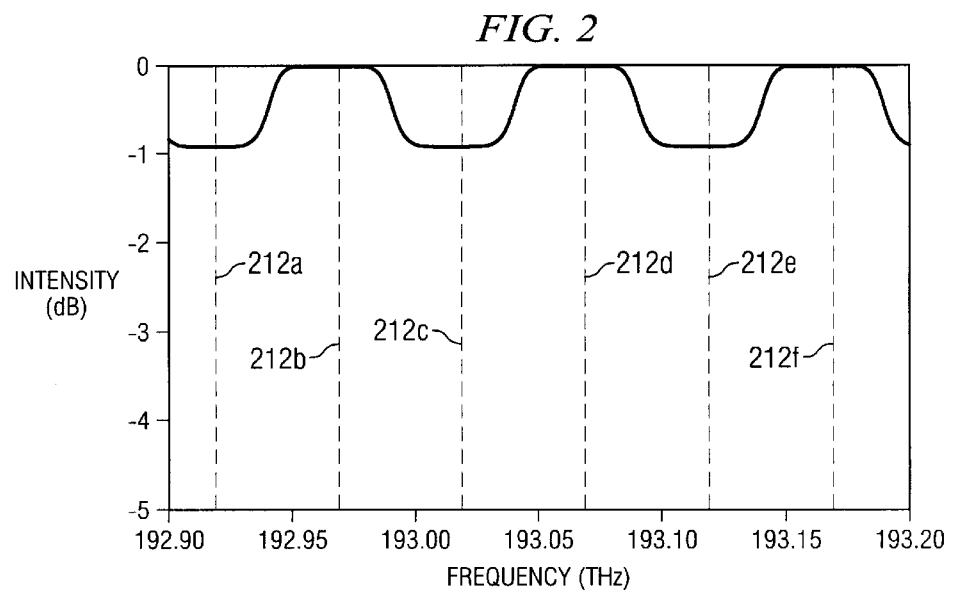
FIG. 2 is a graph depicting the (modeled) optical (intensity) spectrum of the output in the system of FIG. 1 for a split-off ratio of 0.05, as a function of signal frequency.
Figure 3:
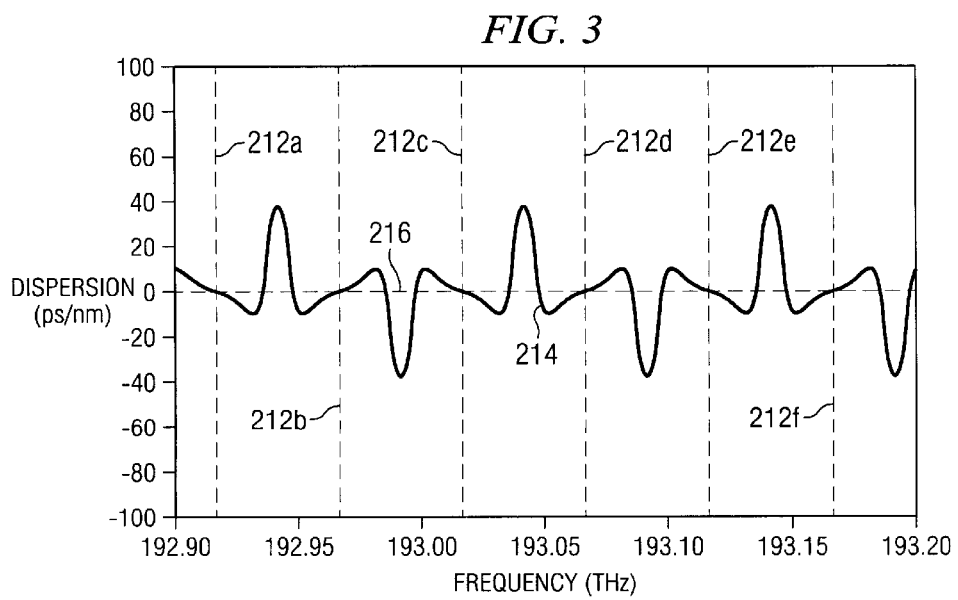
FIG. 3 is a graph depicting (modeled) dispersion in the output signal for a split-off ratio of 0.05 as a function of frequency, achieved according to an embodiment of present invention.

The two reflected beams 118a, 118b (from the mirror and from the resonator respectively) interfere at the beam splitter 116 providing output which is coupled to the same optical fiber 112 (but traveling in the opposite direction 128). The combining of the reflected beams at the beam splitter 116 results in a output beam having dispersion characteristics that are a function of several parameters of the interferometer such as split off ratio, resonator mirror reflectivity and interferometer and resonator path lengths. By changing these parameters, the dispersion of the system depicted in FIG. 1 can be adjusted. FIGS. 2–5 provide illustrative examples, for purposes of explanation and illustration, of adjusting a dispersion parameter. FIG. 2 illustrates a (modeled) output from a device of the type illustrated in FIG. 1, when the split-off ratio S is 0.05. FIG. 3 illustrates corresponding (modeled) dispersion characteristics. By comparing FIGS. 2 and 3, it can be seen that, in the illustrated example, at the centers of the passbands and stop bands 212a-f, the value of the dispersion curve 214 is zero 216. The slopes or wave forms of the dispersion curves for the passbands and stop bands are substantially opposite to (reflections of) each other. By suitably adjusting the center wavelength of the passband or stop band, the center position and sign of dispersion 214 can be changed or adjusted. One approach to changing the center wavelengths is to tune the optical path lengths in the interferometer and the resonator. This can be accomplished by adjusting the position of the mirror 122 resonator 124 and/or resonator reflector 126b with respect to the beam splitter 116.

Figure 4:
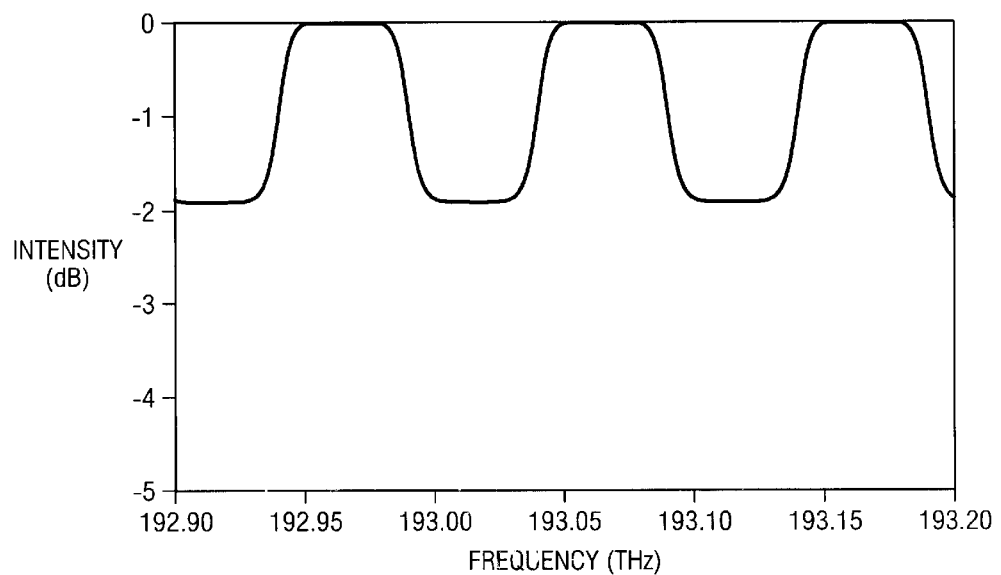
FIG. 4 is a graph corresponding to the graph of FIG. 2 but for a split-off ratio of 0.10.
Figure 5:
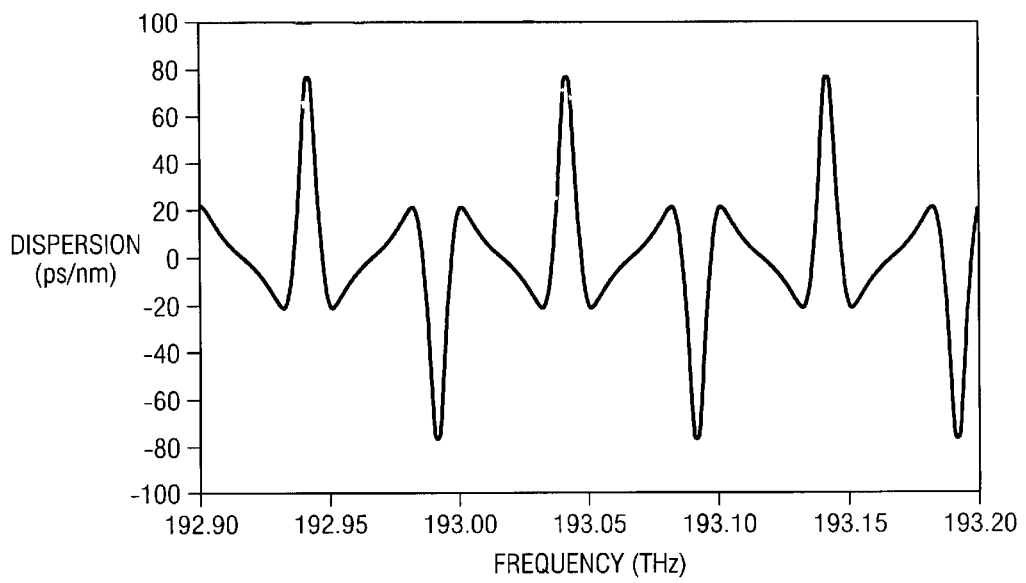
FIG. 5 is a graph corresponding to the graph of FIG. 3 but for a split-off ratio of 0.10.

FIGS. 4 and 5 illustrate that, using embodiments of the present invention, adjustment of the split-off ratio S can be used to adjust the magnitude of dispersion. FIGS. 4 and 5 are similar to FIGS. 2 and 3 except that FIGS. 4 and 5 illustrate the situation when the split-off ratio has been changed from 0.05 to 0.1. Comparing FIGS. 5 and 3, it can be seen that such an increase in split-off ratio results in a substantial increase in dispersion. Accordingly, by controlling the split-off ratio at the beam splitter 116, the magnitude of dispersion can be adjusted. It is noted that the insertion loss at the passband center is independent of the split-off ratio, but the insertion loss at the stop band center increases with the split-off ratio which accordingly can result in some power penalty in certain cases.

Figure 6:
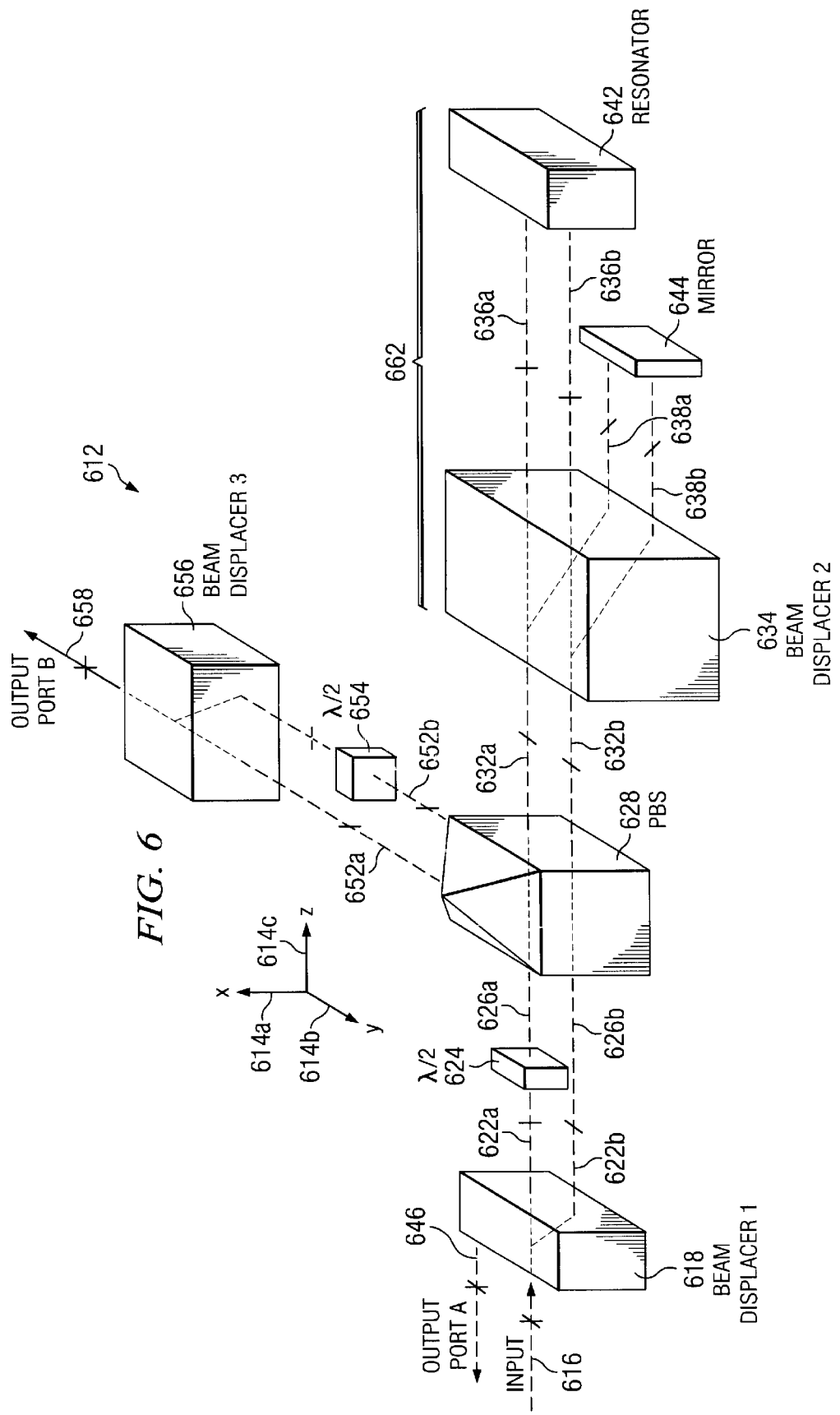
FIG. 6 is a perspective block diagram of the polarization interferometer of a type which can be used in connection with embodiments of the present invention.

A number of devices and methods can be used for adjusting split-off ratio including in the context of a device as illustrated in FIG. 6. FIG. 6 illustrates a polarization interferometer 612. To assist in discussion, FIG. 6 also includes an illustration of the orientation of orthogonal X, Y and Z axes 614*a, b, c*.

In the embodiment of FIG. 6, a collimated beam from an optical fiber 616 propagates along the Z axis and is incident to a first beam displacer 618. A number of devices can be used as beam displacers and those of skill in the art will understand how to select and use a suitable beam displacer, at least after understanding the present disclosure. The first beam displacer 618 splits the laser beam into two beams 622*a* and 622*b* having orthogonal polarizations along X and Y directions respectively (illustrated, in FIG. 6, by arrows respectively parallel to the X and Y axes). A half-wave plate 624 changes the Y polarization to an X polarization so that the two beams are polarized along the Y axis 626*a, b* when they pass through a polarization beam splitter 628. Any of a number of polarization beam splitters can be used for this purpose, and those of skill in the art will understand how to select and use a suitable polarization beam splitter, at least after understanding the present disclosure. The polarization beam splitter 628 is configured to pass Y-polarized beams 626*a*, b without significant attenuation. Accordingly, the beams which exit the polarization beam splitter 628 have a Y-polarization 632*a*, 632*b*. These beams 632*a*, 632*b* are provided to a second beam displacer 634 which splits the Y-polarized beam pair into two pairs of beams orthogonally polarized in the X Y plane 636*a, b,* 638*a, b*. The split-off ratio between the two pairs of beams 636*a, b,* 638*a, b* is a function of the optical axis orientation of the second beam splitter 634. The first pair of beams 636*a, b* is incident to, and reflected by, a resonator 642. The second pair of beams is incident into a high reflectivity mirror 644. The reflected beams back-propagate along the negative Z axis, retracing their beam paths (in the direction from right to left in the illustration of FIG. 6) and recombining into one pair after passing through the second beam displacer 634. Because of the difference in optical path lengths between the first beam pair 636*a,b* and the second beam pair 638*a, b,* the polarization state of the back-propagating beams before reaching the polarization beam-splitter 628 is a function of optical wavelength. The polarization beam-splitter 628 splits the beam pair 632*a*, 632*b* into two pairs. The first pair of beams are polarized along the Y axis and pass substantially straight through the polarization beam-splitter 628, substantially retracing the original beam path, and recombining into a single beam when passing through the first beam displacer 618 to form Output Port A 646. The other pair of beams 652*a, b* are polarized along the X axis and recombine, (after rotating one beam, e.g. by a half wave plate 654) in a third beam displacer 656 to form Output Port B 658. In at least one embodiment, only the signal at Output Port A 646 is used for dispersion compensation. By rotating the assembly 662, which includes the second beam displacer 634, the resonator 642 and the mirror 644, about a rotation axis parallel to the Z axis 614*c,* the split-off ratio can be changed (due to the change in direction of the optical axis of BD2 of the second beam displacer 634). Those of skill in the art will understand other devices and procedures for changing an optical axis or changing a split-off ratio, at least after understanding the present disclosure. As noted above, changing the split-off ratio can be used for adjusting the magnitude of dispersion in the output signal 646.

In light of the above discussion, a number of advantages of the present invention can be seen. The present invention can be used to fully or partially compensate dispersion in an optical system in a manner that allows for selection or adjustment of one or more dispersion parameters such as magnitude, center wavelength (e.g. position of zero dispersion wavelengths with respect to signal passband or stop band centers or other locations in the signal) and/or the slope or wave form of the dispersion curve (as a function of the frequency). By providing for adjustability of dispersion parameters, a dispersion compensation device and method according to the present invention can be used in a relatively wide variety of applications, making embodiments of the present invention more versatile and adaptable to various needs and uses. The present invention can be implemented in the context of (such as by adjusting or modifying) optical devices such as interferometers.

Although the present invention has been described in the context of several examples and embodiments, a number of variations and modifications to the invention can also be used. Although it is contemplated the present invention would be particularly useful in the context of optical data communication, such as WDM signal communication, the present invention can be used in any optical device where dispersion compensation is desired. Although embodiments of the present invention were described with reference to the examples of FIG. 1 and FIG. 6, the present invention can be implemented in the context of any of a variety of different types of interferometers. For example, one implementation can consist of a free-space interferometer, with a device that controls the beam split-off ratio at the beam splitter, such as a half wave plate mounted on a rotation stage. Another implementation is a fiber optic interferometer made with a coupler and a means to change the split-off ratio. The same principle as described above can also be implemented with other methods including Mach-Zender interferometer implementations.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A dispersion compensation apparatus comprising:
   an interferometer configured to split at least a first input optical signal associated with a first optical dispersion characterized by at least a first dispersion parameter into at least first and second distinct beams and later interfere said first and second beams to form an output optical signal associated with a second optical dispersion characterized by the at least a first dispersion parameter; and
   wherein the interferometer comprises a beam diverter operable to rotate about an optical axis such that the at least a first dispersion parameter is adjusted and the second optical dispersion is different from the first optical dispersion.

2. Apparatus as claimed in claim 1 wherein said at least a first dispersion parameter is dispersion magnitude.

3. Apparatus as claimed in claim 1 wherein said at least a first dispersion parameter is center wavelength.

4. Apparatus as claimed in claim 1 wherein said at least a first dispersion parameter is dispersion slope.

5. Apparatus as claimed in claim 1 wherein the interferometer comprises at least one of a mirror and a resonator operable to adjust a path length of at least one of the first and second beams.

6. Apparatus as claimed in claim 5 wherein adjustment of said path length adjusts a center position of said second optical dispersion.

7. Apparatus as claimed in claim 5 wherein said adjustment of said path length adjusts the slope of said second optical dispersion.

8. Apparatus as claimed in claim 1 wherein rotation of said beam diverter adjusts at least a first split-off ratio of said interferometer.

9. Apparatus as claimed in claim 8 wherein adjusting said split-off ratio changes a magnitude of said second optical dispersion.

10. A method as claimed in claim 1 wherein said step of adjusting at least a part of said interferometer comprises adjusting at least one of a split-off ratio, a resonator mirror reflectivity, and a path length of at least one of the first and second beams.

11. Apparatus as claimed in claim 1 wherein the beam diverter comprises a beam displacer, a resonator, and a mirror.

12. Apparatus as claimed in claim 11 wherein:
    the input optical signal comprises first and second transversely polarized signal segments;
    the beam displacer is operable to separate the first and second signal segments into two pairs of transversely-polarized beams;
    the resonator reflects a portion of the beam pairs; and
    the mirror reflects a portion of the beam pairs.

13. Apparatus as claimed in claim 12 wherein:
    the beam displacer is further operable to process the beam pairs to produce two beams, each beam having mixed polarization as a function of wavelength; and
    a component of one beam is combined with a component of the other beam to form at least a portion of the output optical signal.

14. Apparatus as claimed in claim 1, wherein the magnitude of the second optical dispersion is less than the magnitude of the first optical dispersion.

15. A method for compensating dispersion in an optical system comprising:
    receiving an input optical signal associated with a first optical dispersion characterized by at least a first dispersion parameter;
    processing the input optical signal using an interferometer configured to split the input optical signal into at least first and second distinct beams;
    interfering said first and second beams to form an output optical signal associated with a second optical dispersion characterized by the at least a first dispersion parameter; and
    adjusting at least part of said interferometer to adjust the at least a first dispersion parameter such that the second optical dispersion is different from the first optical dispersion;
    wherein the input optical signal includes first and second transversely polarized signal segments, and processing the input optical signal further comprises:
        displacing the first signal segment relative to the second signal segment such that the first and second signal segments follow different optical paths;
        rotating the polarization of the first signal segment such that the first and second signal segments have substantially the same polarization;
        decomposing the first signal segment and the second signal segment into two pairs of transversely-polarized beams; and
        reflecting a first portion of the beam pairs using a resonator and a second portion of the beam pairs using a mirror.

16. A method as claimed in claim 15 wherein said at least a first dispersion parameter is at least one of a dispersion magnitude, a center wavelength and a dispersion slope.

17. A method as claimed in claim 15 wherein the interferometer comprises a resonator positioned to receive the first beam and a mirror positioned to receive the second beam.

18. A method as claimed in claim 15 wherein interfering further comprises:
    processing the beam pairs to produce two beams, each beam having mixed polarization as a function of wavelength; and
    forming at least a portion of the output optical signal using components of the two beams.

19. A method as claimed in claim 15 wherein a magnitude of the second optical dispersion is less magnitude of the first optical dispersion.

20. A dispersion compensation apparatus comprising:
    interferometer means for splitting at least a first input optical signal associated with a first optical dispersion characterized by at least a first dispersion parameter into at least first and second distinct beams and for later interfering said first and second beams to form an output optical signal associated with a second optical dispersion characterized by the at least a first dispersion parameter; and
    wherein the interferometer means comprises means for rotating about an optical axis such that the at least a first dispersion parameter is adjusted and the second optical dispersion is different from the first optical dispersion.

21. A dispersion compensation apparatus as claimed in claim 20 further comprising means for adjusting at least a part of said interferometer to adjust at least one of a split-off ratio, a resonator mirror reflectively, and a path length of a least one of the first and second beams.

22. A dispersion compensation apparatus as claimed in claim 20 wherein the at least a first dispersion parameter comprises at least one of a dispersion magnitude, a center wavelength, and a dispersion slope.

23. A dispersion compensation apparatus as claimed in claim 20 wherein the interferometer means comprises at least one of a free-space interferometer, a fiber optic interferometer, and Mach-Zender interferometer.

24. A dispersion compensation apparatus as claimed in claim 20 wherein a magnitude of the second optical dispersion is less than a magnitude of the first optical dispersion.

* * * * *